US010059233B2

(12) United States Patent
Suzuki et al.

(10) Patent No.: US 10,059,233 B2
(45) Date of Patent: Aug. 28, 2018

(54) SEAT ADJUSTER AND VEHICLE SEAT

(71) Applicant: TOYOTA BOSHOKU KABUSHIKI KAISHA, Aichi (JP)

(72) Inventors: Hiroyuki Suzuki, Aichi (JP); Naoki Goto, Aichi (JP); Tateki Kawamura, Aichi (JP); Naoaki Hoshihara, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/600,994

(22) Filed: May 22, 2017

(65) Prior Publication Data

US 2017/0341537 A1 Nov. 30, 2017

(30) Foreign Application Priority Data

May 27, 2016 (JP) .................................. 2016-106357

(51) Int. Cl.
*B60N 2/20* (2006.01)
*B60N 2/22* (2006.01)
*B60N 2/02* (2006.01)

(52) U.S. Cl.
CPC ............. *B60N 2/20* (2013.01); *B60N 2/2222* (2013.01); *B60N 2/2245* (2013.01); *B60N 2/02* (2013.01); *B60N 2/22* (2013.01)

(58) Field of Classification Search
CPC ....... B60N 2/20; B60N 2/2222; B60N 2/2245
USPC .................................................... 297/362.11
See application file for complete search history.

(56) References Cited

U.S. PATENT DOCUMENTS

| 7,520,568 B2 | 4/2009 | Hoshihara et al. | |
| 7,997,655 B2* | 8/2011 | Sakai | B60N 2/0232 297/362.11 |
| 8,388,067 B2* | 3/2013 | Hida | B60N 2/0232 297/362.11 |
| 2007/0126272 A1* | 6/2007 | Deptolla | B60N 2/206 297/362.11 X |
| 2007/0200408 A1* | 8/2007 | Ohta | B60N 2/0232 297/362.11 |
| 2008/0001458 A1 | 1/2008 | Hoshihara et al. | |

FOREIGN PATENT DOCUMENTS

| JP | 2006-34729 | 2/2006 |
| JP | 2015-146874 | 8/2015 |

* cited by examiner

*Primary Examiner* — Anthony D Barfield
(74) *Attorney, Agent, or Firm* — Greenblum & Bernstein, P.L.C.

(57) ABSTRACT

A seat adjuster for a vehicle seat is provided. The seat adjuster comprises a rotation mechanism that comprises a rotation part, a rotation drive device that rotates the rotation part, an engagement target member that is configured to be rotated integrally with the rotation part and comprises engagement target portions formed along a rotational direction of the engagement target member, and an engagement member that is configured so that, when one of the engagement target portions is located in a specified engageable position, the engagement member is moved in a direction closer to the engagement target member to be engageable with the one of the engagement target portions located in the specified engageable position.

6 Claims, 6 Drawing Sheets

SEAT ADJUSTER AND VEHICLE SEAT

CROSS-REFERENCE TO RELATED APPLICATIONS

This application claims the benefit of Japanese Patent Application No. 2016-106357 filed on May 27, 2016 with the Japan Patent Office, the entire disclosure of which is incorporated herein by reference.

BACKGROUND

The present disclosure relates to a seat adjuster and a vehicle seat comprising the seat adjuster.

As a device to adjust a reclining angle of a seatback with respect to a seat cushion, an electric recliner is known that is capable of electrically adjusting the reclining angle by electrically rotating the seatback, as disclosed, for example, in Japanese Unexamined Patent Application Publication No. 2015-146874 (Patent Document 1) and/or Japanese Unexamined Patent Application Publication No. 2006-34729 (Patent Document 2) (see, especially, Patent Document 1).

The electric recliner disclosed in Patent Document 2 is also configured to allow a mechanical connection between the seatback and the electric recliner to be released so that the seatback can be manually folded substantially forward.

SUMMARY

Easiness of getting in and out of rear seats as well as easiness of loading the rear seats can be improved by adopting techniques disclosed in Patent Document 2 to adjust the reclining angle of the seatback electrically at usual times and fold the seatback forward manually as required.

According to the techniques disclosed in Patent Document 2, however, when the mechanical connection between the seatback and the electric recliner is released to fold the seatback forward, it is necessary to manually raise the seatback so that the reclining angle of the seatback can be electrically adjusted by the electric recliner later again.

This fails to satisfy the need to, for example, quickly fold the seatback forward manually and then raise the seatback into place automatically with ease, and thus convenience is not good enough.

It is desirable, in one aspect of the present disclosure, to improve convenience in adjusting an angle of a seatback of a vehicle seat configured to be able to automatically adjust the angle of the seatback.

One embodiment of the present disclosure is a seat adjuster attached to a vehicle seat comprising a seat cushion and a seatback pivotally supported to be rotatable relative to the seat cushion. The seat adjuster comprises a rotation mechanism, a rotation drive device, an engagement target member, and an engagement member.

The rotation mechanism comprises a rotation part. The rotation part is coupled to one of the seat cushion or the seatback and configured to be rotatable relative to a target to which the rotation part is coupled. The rotation drive device is configured to rotate the rotation part of the rotation mechanism. The engagement target member is coupled to the rotation part of the rotation mechanism and configured to be rotated integrally with the rotation part. The engagement target member comprises engagement target portions formed along a rotational direction of the engagement target member.

The engagement member is coupled to the other of the seat cushion or the seatback and configured to be movable in a direction closer to the engagement target member and in a direction away from the engagement target member. The engagement member is configured so that, when one of the engagement target portions is located in a specified engageable position with respect to the engagement member, the engagement member is moved in the direction closer to the engagement target member to be engageable with the one of the engagement target portions located in the specified engageable position.

The seat adjuster configured as such allows automatic adjustment of a position of the seatback in a locked state where the engagement member is in engagement with one of the engagement target portions, since, in the locked state, rotation of the rotation part of the rotation mechanism by the rotation drive device rotates the seatback.

In an unlocked state where the engagement member is in engagement with none of the engagement target portions, the seatback is freely rotatable with respect to the rotation part of the rotation mechanism, and the rotation part of the rotation mechanism is freely rotatable with respect to the seatback.

When the seatback is up in a position that allows an occupant to be seated, separating the engagement member from the engagement target member to disengage the engagement member from the one of the engagement target portions in engagement therewith allows the seatback to be quickly folded forward without operating the rotation mechanism.

After the seatback is folded forward, rotating the rotation part of the rotation mechanism by the rotation drive device to locate one of the engagement target portions in the engageable position allows the engagement member to be engaged with the one of the engagement target portions located in the engageable position while the seatback is in a folded state. Thus, rotating the rotation part of the rotation mechanism by the rotation drive device after the engagement member is brought into engagement with one of the engagement target portions allows the seatback to automatically return, by a driving force of the rotation drive device, from the folded state to the position that allows an occupant to be seated again.

Moreover, the engagement target portions are formed in the engagement target member along the rotational direction. Thus, when the engagement target member along the rotational direction. Thus one of the engagement target portions after the seatback is folded forward, rotating the engagement target member to move the one of the engagement target portions located closest to the engagement member to the engageable position can reduce time required to bring the engagement member into engagement with one of the engagement target portions. This allows the seatback to automatically return quickly again to the position that allows an occupant to be seated after the seatback is folded forward.

Thus, the seat adjuster configured as above can offer improved convenience in adjusting an angle of the seatback of the vehicle seat configured to be able to automatically adjust the angle of the seatback.

The seat adjuster configured as above may further comprise an engagement drive device. The engagement drive device is a unit that moves the engagement member in the direction closer to the engagement target member and in the direction away from the engagement target member.

The engagement drive device allows the engagement member to be automatically and easily moved closer to and away from the engagement target member, thus allowing the engagement member and one of the engagement target portions to be engaged with and disengaged from each other automatically and easily.

The engagement target member and the engagement member may be configured respectively as follows. The engagement target member may have a disk shape. The engagement target member may comprise the engagement target portions formed at different locations in an outer peripheral edge of the engagement target member. In the other of the seat cushion or the seatback, the engagement member may be pivotally supported and coupled to be rotatable in a plane parallel with a plate surface of the engagement target member, and configured so that a rotation of the engagement member produces a movement thereof in the direction closer to the engagement target member or in the direction away from the engagement target member.

The seat adjuster configured as such allows the engagement target member to have a simple configuration. Further, it also allows the engagement member to be easily engaged with and disengaged from one of the engagement target portions by rotating the engagement member.

In the engagement target member, the engagement target portions may be formed along the rotational direction at equal angular intervals. Forming the engagement target portions at equal angular intervals is, in other words, forming the engagement target portions along the rotational direction at intervals of the angle of 360 degrees divided by the number of the engagement target portions.

The seat adjuster configured as such, which comprises the engagement target portions formed in the engagement target member at equal angular intervals, allows the engagement member to be engaged more quickly with the one of the engagement target portions located closest to the engagement member when the engagement member is again brought into engagement with one of the engagement target portions after the seatback is folded forward.

A specific value for each of the equal angular intervals may be decided on as appropriate. In the seatback configured to be rotatable with respect to the seat cushion within a rotatable angle from a specified frontmost tilt position to a specified rearmost tilt position, each of the equal angular intervals may have a value larger than the above rotatable angle of the seatback.

According to the seat adjuster configured as such, in a process of forward folding of the seatback after the engagement member and the engagement target member are disengaged from each other, the engagement member will be engaged with none of the engagement target portions if it should be biased against the engagement target member. This prevents the forward folding from being unintentionally obstructed during the process of the forward folding.

The seat adjuster may be configured so that the rotation mechanism is coupled to the seat cushion and the engagement member is coupled to the seatback. Such a configuration allows the rotation drive device for rotating the rotation part of the rotation mechanism and an element for moving the engagement member both to be arranged in the seatback, thus achieving compactness of the overall seat adjuster. In particular, when the seat adjuster comprises the aforementioned engagement drive device as an element for moving the engagement member, arranging the rotation drive device and the engagement drive device both in the seatback achieves a high level compatibility of the compactness of the overall seat adjuster and the convenience of the user.

Another embodiment of the present disclosure is a vehicle seat comprising a seat cushion, a seatback pivotally supported to be rotatable relative to the seat cushion, and the aforementioned seat adjuster. The vehicle seat configured as such can offer improved convenience in adjusting an angle of the seatback.

BRIEF DESCRIPTION OF THE DRAWINGS

An example embodiment of the present disclosure will now be described with reference to the drawings, in which.

DETAILED DESCRIPTION OF THE PREFERRED EMBODIMENTS (1) Summary of Vehicle Seat

Figure 1:
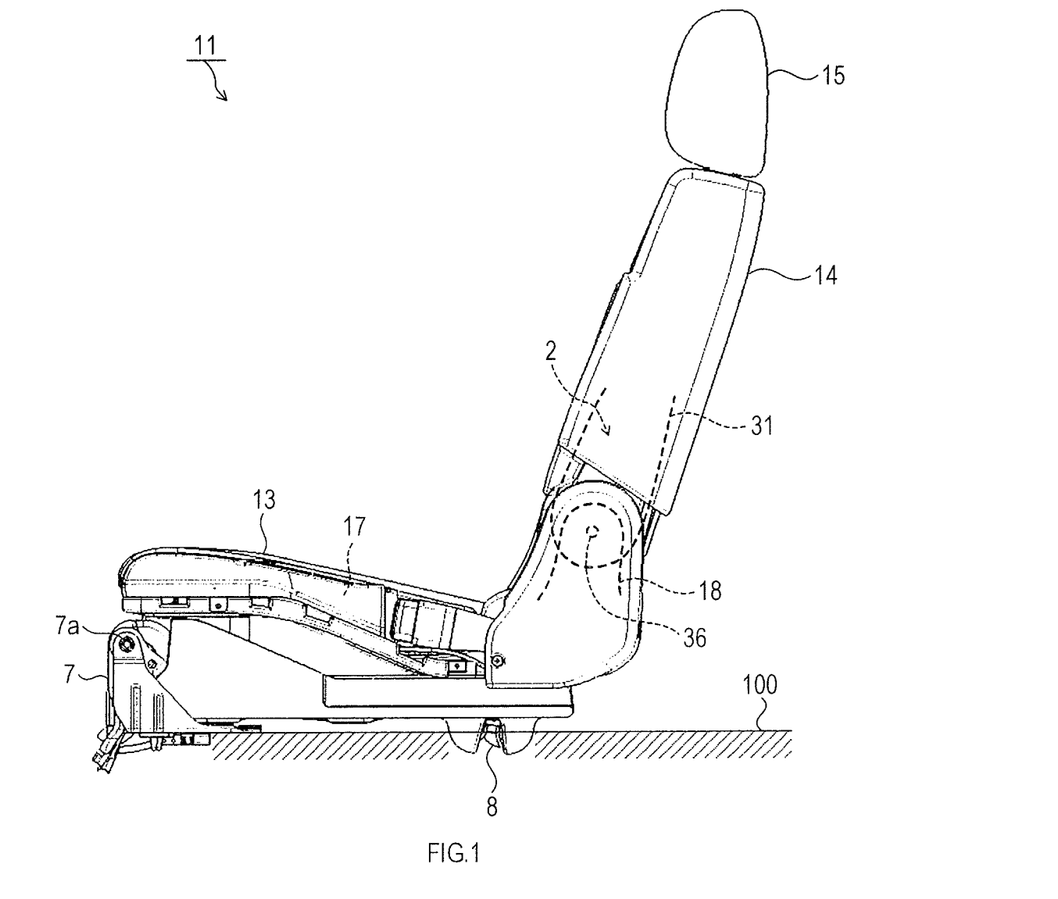
FIG. 1 is a side view of a seat in one embodiment.

A vehicle seat (hereinafter, referred to simply as "a seat") 11 shown in FIG. 1 is configured to be installable in vehicles of various types including, for example, automobiles, train cars, and aircrafts. In the present embodiment, the seat 11 is described as being installed in the second row of an automobile with three row seating, as one example. In the description below, "front/forward" means at/toward a front side in a front-rear direction of a vehicle and "rear/rearward" means at/toward a rear side in the front-rear direction of the vehicle.

As shown in FIG. 1, the seat 11 comprises a seat cushion 13 and a seatback 14. The seat cushion 13 supports the buttocks of a seated person, and the seatback 14 supports the back of the seated person. Attached to a top of the seatback 14 is a headrest 15 that supports the head of the seated person.

The seat cushion 13 is mounted to a floor 100 in an interior of the automobile. A tumble mechanism 7 also is mounted to the floor 100, and a front end of the seat cushion 13 is pivotally supported by a hinge 7a of the tumble mechanism 7. Such a configuration allows the seat 11 to rotate around the hinge 7a of the tumble mechanism 7 and thus to be brought into a tumbled state.

Attached to a rear bottom surface of the seat cushion 13 is a floor lock 8. The floor lock 8 is a mechanism for locking the seat 11 to the floor 100. In a state where the seat 11 is locked to the floor 100 by the floor lock 8, the tumble mechanism 7 cannot rotate the seat 11. When the floor lock 8 is unlocked to release the seat 11 from the floor 100, the seat 11 can be brought into the tumbled state by rotating the seat 11 forward by the tumble mechanism 7.

The seatback 14 is pivotally supported to be rotatable around a shaft 36 relative to the seat cushion 13. Specifically, the seat cushion 13 comprises a lower arm 17 as a frame of the seat cushion 13. Fixedly coupled to a rear end of the lower arm 17 is a lower plate 18. The seatback 14 comprises a side frame 31 as a frame of the seatback 14.

A seat adjuster 2 is attached to the seat 11 to rotate the side frame 31 relative to the lower plate 18 (therefore, to rotate the seatback 14 relative to the seat cushion 13).

Figure 2:
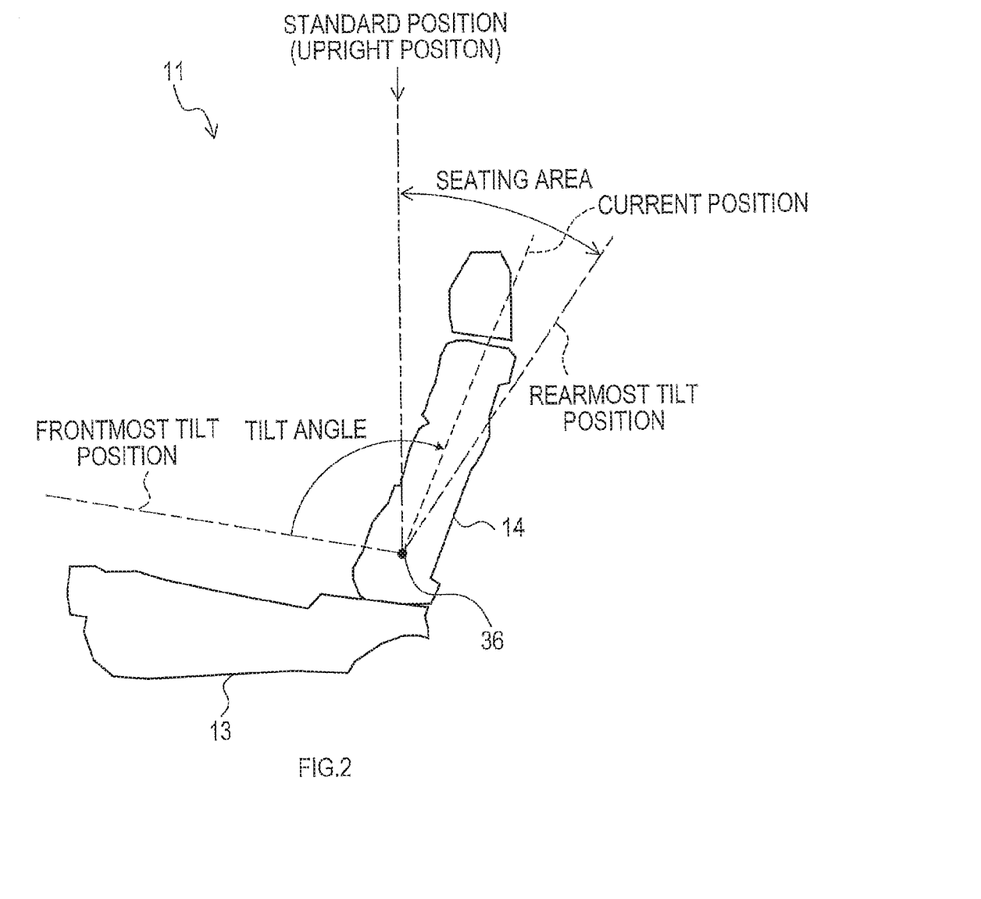
FIG. 2 is an explanatory diagram illustrating a range of rotation of a seatback in one embodiment.

A rotatable range of the seatback 14 will be described with reference to FIG. 2. As shown in FIG. 2, the seatback 14 is rotatable in a range from a frontmost tilt position to a rearmost tilt position. The frontmost tilt position is a position of the seatback 14 when it is folded forward to the maximum, and the rearmost tilt position is a position of the seatback 14 when it is reclined rearward to the maximum.

An angle of the seatback 14 with reference to the frontmost tilt position is called a tilt angle. When the seatback 14 is in the frontmost tilt position, the tilt angle of the seatback 14 is 0 degree. As the seatback 14 is rotated rearward from the frontmost tilt position, the tilt angle increases to become largest at the rearmost tilt position.

The tilt angle of the seatback 14 can be changed electrically. Specifically, in a seating area from a specified standard position to the rearmost tilt position within the rotatable range, a user can change the tilt angle of the seatback 14 continuously or stepwise by operating a not-shown reclining switch. The standard position of the present embodiment is an upright position, that is, a position in which the seatback 14 stands approximately vertically to the floor 100.

Folding the seatback 14 forward to the frontmost tilt position brings the seat 11 into a state where a rear surface of the seatback 14 is approximately parallel to the floor 100 (hereinafter, referred to as a "table state"). This allows the rear surface of the seatback 14 to be used, for example, as a table. The seat 11 in the table state can be changed further into the tumbled state by unlocking the floor lock 8 to release the seat 11 from the floor 100.

(2) Configuration of Seat Adjuster

Next, a detailed configuration of the seat adjuster 2 will be described with reference to FIG. 3 and FIG. 4. The seat adjuster 2 comprises a recliner 20, a coupling gear 21, a lock mechanism 40, a reclining motor 37 (omitted from FIG. 3, see FIG. 4), and a seatback lock release motor 53 (hereinafter, referred to as a "release motor 53").

The recliner 20 is a mechanism for electrically adjusting the tilt angle of the seatback 14 and is fixedly coupled to the lower plate 18. More specifically, a recliner fixing hole 18a is formed in the lower plate 18 as shown in FIG. 4, and the recliner 20 is fixedly coupled to the lower plate 18 so that one side of the recliner 20 is partially fitted in the recliner fixing hole 18a.

Figure 4:
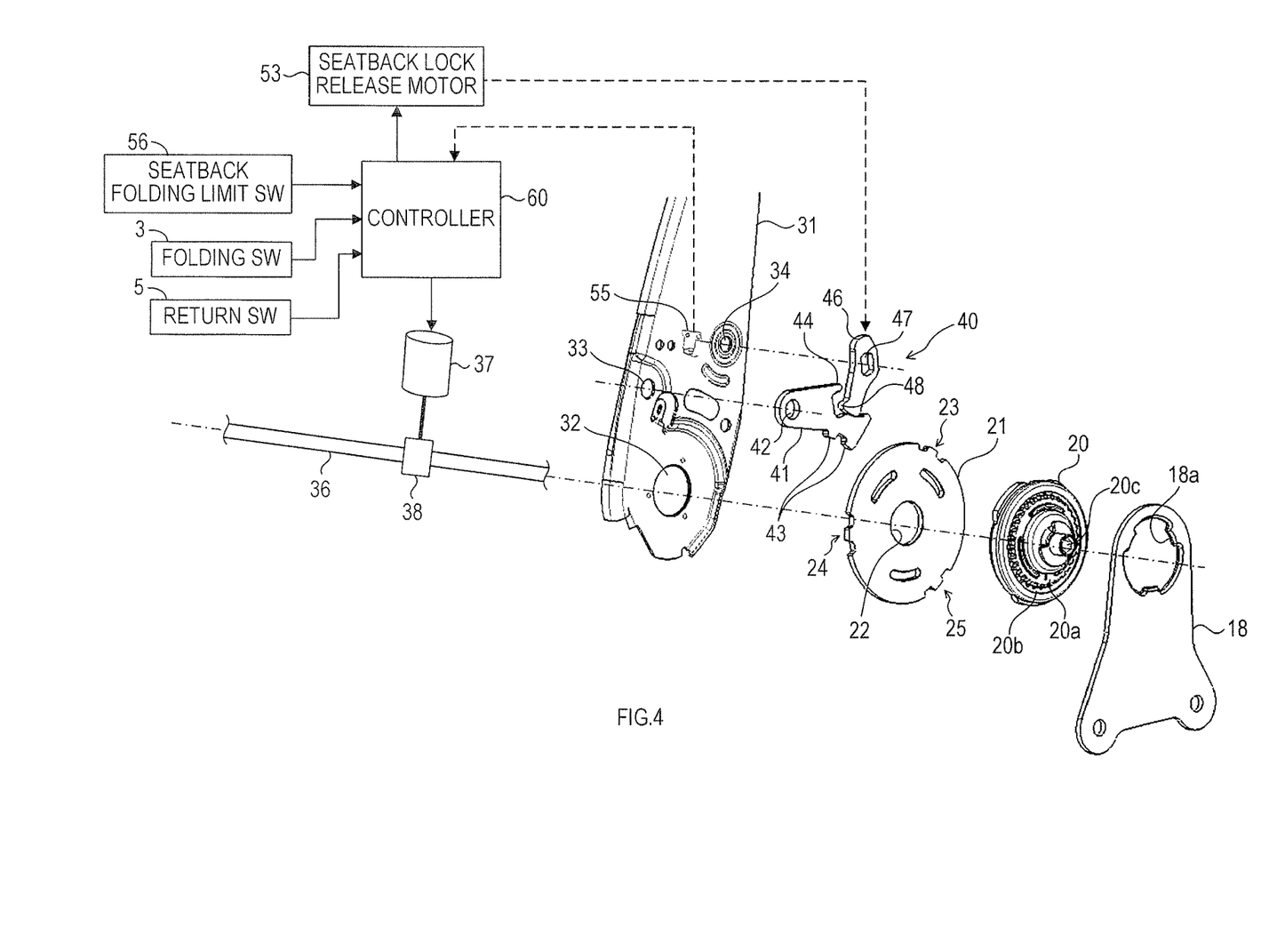
FIG. 4 is an exploded perspective view of the seat adjuster in one embodiment.

The recliner 20 comprises an external gear 20a and an internal gear 20b as shown in FIG. 4. The external gear 20a and the internal gear 20b are arranged approximately coaxially with each other so that external teeth formed around an outer peripheral surface of the external gear 20a face internal teeth formed circumferentially on the internal gear 20b. A shaft 36 that is rotationally driven by the reclining motor 37 is inserted in a shaft through hole 20c of the recliner 20. When the shaft 36 is rotated, the internal gear 20b is eccentrically rotated relative to the external gear 20a. A description of a detailed configuration of the recliner 20 comprising the external gear 20a and the internal gear 20b will herein be omitted since the detailed configuration thereof is well-known as disclosed in detail in Patent Documents 1 and 2.

The shaft 36 is driven by the reclining motor 37. The reclining motor 37 is arranged inside the seatback 14. A rotational drive force of the reclining motor 37 is transmitted to the shaft 36 through a rotation transmission mechanism 38, so that the shaft 36 is rotated when the reclining motor 37 is rotated.

A shaft through hole 32 is formed in the side frame 31 of the seatback 14 as shown in FIG. 4. A shaft through hole 22 is formed in the coupling gear 21. The shaft 36 passes through the shaft through hole 32 in the side frame 31 and the shaft through hole 22 in the coupling gear 21, to then be inserted in the shaft through hole 20c in the recliner 20.

Since the recliner 20 is fixedly coupled to the lower plate 18, the external gear 20a also is fixedly coupled to the lower plate 18. Thus, when the shaft 36 is rotated, the internal gear 20b is rotated relative to the lower plate 18.

The coupling gear 21 is fixedly coupled to the internal gear 20b of the recliner 20 coaxially with a rotational axis of the internal gear 20b. Thus, when the internal gear 20b of the recliner 20 is rotated by rotation of the shaft 36, the coupling gear 21 integrally coupled to the internal gear 20b is also rotated integrally with the internal gear 20b.

Figure 5:
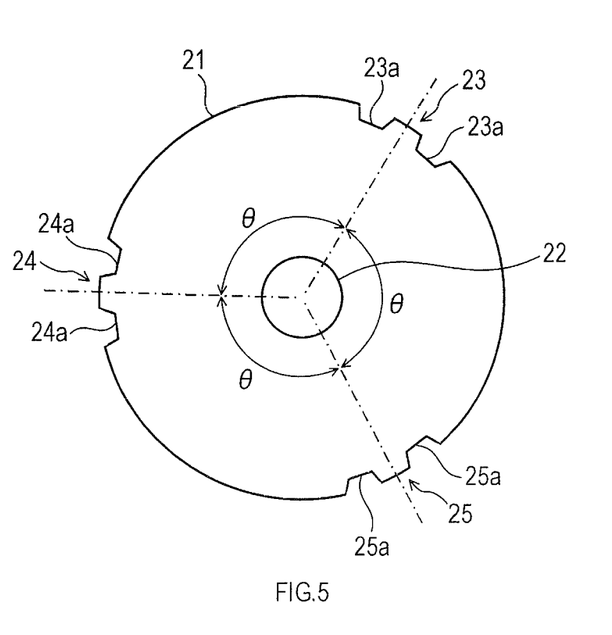
FIG. 5 shows a detailed configuration of a coupling gear as an element of the seat adjuster according to the embodiment.

The coupling gear 21 has an overall disk shape, comprising a first engagement target portion 23, a second engagement target portion 24, and a third engagement target portion 25 formed at three different locations in an outer peripheral edge of the coupling gear 21. More specifically, as shown in FIG. 5, the three engagement target portions 23 to 25 are formed in the coupling gear 21 along a rotational direction of the coupling gear 21 at equal angular intervals. In the present embodiment, each of the angular intervals θ of the engagement target portions is 120 degrees since the three engagement target portions 23 to 25 are formed along the rotational direction of the coupling gear 21.

In the present embodiment, the engagement target portions 23 to 25 are formed in the coupling gear 21 in accordance with the following three conditions. The first condition is that each of the angular intervals θ between engagement target portions adjacent to each other in a circumferential direction, from among the engagement target portions, is an angle larger than the rotatable range of the seatback 14 (larger than the angle from the frontmost tilt position to the rearmost tilt position). The second condition is that the engagement target portions are arranged at equal angular intervals. The third condition is that, if there is more than one angular interval that meets the first condition and the second condition, each of the angular intervals θ should be set at the smallest one of them.

In the present embodiment, the rotatable range of the scatback 14 (the angle from the frontmost tilt position to the rearmost tilt position) is, for example, at or near 110 degrees and is smaller than 120 degrees. Thus, there are two angular intervals θ that meet the first condition and the second condition, namely 120 degrees and 180 degrees. It is 120 degrees that meets the third condition from among the two angles. Thus, the coupling gear 21 of the present embodiment is configured to have the three engagement target portions 23 to 25 formed at 120-degree intervals.

The first engagement target portion 23 comprises two engagement recesses 23a. The second engagement target portion 24 and the third engagement target portion 25 each have exactly the same shape as the first engagement target portion 23; the second engagement target portion 24 comprises two engagement recesses 24a and the third engagement target portion 25 comprises two engagement recesses 25a. The engagement target portions 23 to 25 are configured so that two engagement projections 43 of the lock plate 41 to be described later are engageable in their respective two engagement recesses.

Figure 3:
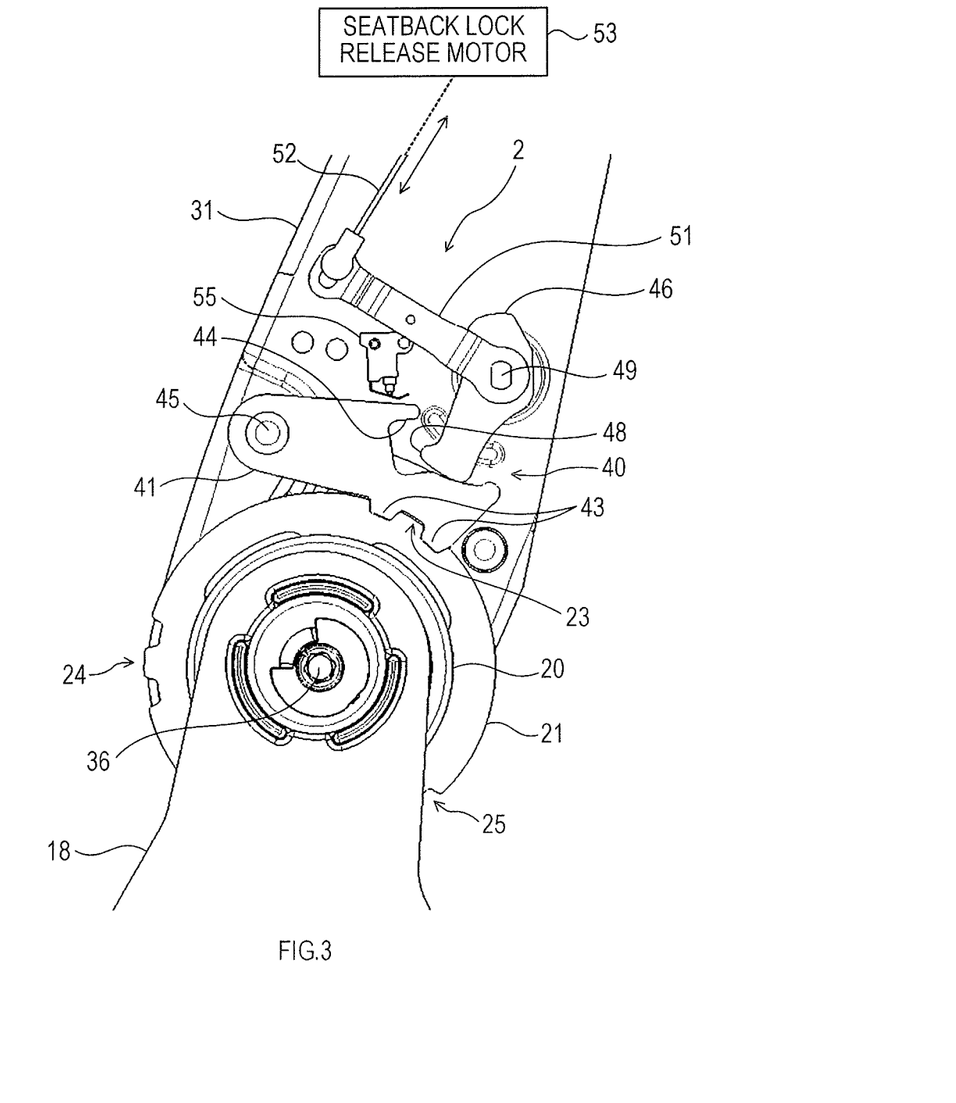
FIG. 3 shows a seat adjuster attached to the seat in one embodiment, viewed from a side of the seat.

The lock mechanism 40 comprises a lock plate 41 and a cam 46 as shown in FIG. 3 and FIG. 4. The lock plate 41 is pivotally supported by and rotatably coupled to the side frame 31. As shown in FIG. 4, a lock shaft through hole 42 is formed in the lock plate 41, and a first through hole 33 is formed in the side frame 31. As shown in FIG. 3, a lock shaft 45 passes through the lock shaft through hole 42 and the first through hole 33, allowing the lock plate 41 to rotate around the lock shaft 45.

The lock plate 41 is arranged so that a plate surface thereof is in approximately the same plane as a plate surface of the coupling gear 21 as shown in FIG. 3. The lock plate 41 is configured to be rotatable in directions closer to and away from an outer peripheral side surface of the coupling gear 21 in a plane parallel to the plate surface of the coupling gear 21.

The two engagement projections 43 are formed on a side surface of the lock plate 41 facing the coupling gear 21. When the lock plate 41 is rotated in the direction closer to the coupling gear 21 (rotated clockwise in FIG. 3) while any one of the three engagement target portions 23 to 25 of the coupling gear 21 is in an engageable position which allows engagement with the engagement projections 43 of the lock plate 41, the lock plate 41 is brought into engagement with that engagement target portion. More specifically, the engagement projections 43 of the lock plate 41 are brought into engagement in the engagement recesses of the engagement target portion, thus bringing the lock plate 41 into a state of being locked to the coupling gear 21. In other words, this is a state where the lock plate 41 is mechanically coupled and locked to the recliner 20, and therefore, where the seatback 14 is coupled and locked to the recliner 20.

FIG. 3 shows that the first engagement target portion 23 of the coupling gear 21 is located in the engageable position and the engagement projections 43 of the lock plate 41 are in engagement with the first engagement target portion 23, so that the coupling gear 21 is in a locked state.

When the lock plate 41 is in the state of being locked to the coupling gear 21, rotating the lock plate 41 in the direction away from the coupling gear 21 (rotated counterclockwise in FIG. 3) disengages the engagement projections 43 of the lock plate 41 from the engagement target portion of the coupling gear 21 in engagement therewith to release the lock plate 41 from engagement, thus releasing the coupling gear 21 from the state of being locked by the lock plate 41.

The lock plate 41 is biased toward the direction closer to the coupling gear 21 by a not-shown elastic member (for example, a coil spring). Thus, the engagement projections 43 of the lock plate 41 are basically in constant contact with the coupling gear 21 and, when any one of the engagement target portions is in the engageable position, the lock plate 41 is in the locked state, where the engagement projections 43 thereof are in engagement with that engagement target portion. An operation to separate the lock plate 41 from the coupling gear 21 is performed by the cam 46.

The cam 46 is pivotally supported by and rotatably coupled to the side frame 31. As shown in FIG. 4, a camshaft through hole 47 is formed in the cam 46, and a second through hole 34 is formed in the side frame 31. A camshaft 49 passes through the camshaft through hole 47 and the second through hole 34 as shown in FIG. 3, allowing the cam 46 to rotate around the camshaft 49.

As shown in FIG. 3, the camshaft 49 passes through one end of a cam drive arm 51. A wire 52 is coupled to the other end of the cam drive arm 51. The cam drive arm 51 is pivotally supported by the side frame 31 and coupled thereto to be rotatable around an axis at an approximately intermediate position in a longitudinal direction of the cam drive arm 51. The camshaft 49 has a rectangular cross section with rounded corners, which provides a fixed positional relationship between the cam 46 and the cam drive arm 51 relative to each other.

The cam 46 is biased toward a direction of counterclockwise rotation in FIG. 3 by a not-shown elastic member. However, when the cam 46 is rotated in the counterclockwise direction in FIG. 3, it abuts the lock plate 41 as shown in FIG. 3 to thereby restrict the counterclockwise rotation. As to directions of rotation of the cam 46, the counterclockwise direction in FIG. 3 is also called a locking direction, and the clockwise direction is also called an unlocking direction.

Rotation of the cam 46 in the unlocking direction is performed by the release motor 53. Rotation of the release motor 53 pulls the wire 52, thus rotating the cam 46 in the unlocking direction against a biasing force of the elastic member.

As the rotation of the cam 46 in the unlocking direction proceeds by the release motor 53, a releasing projection 48 formed on an end of the cam 46 abuts a release-action portion 44 of the lock plate 41. As the rotation of the cam 46 in the unlocking direction proceeds further, the lock plate 41 is rotated toward the direction away from the coupling gear 21 to be separated from the coupling gear 21 by an operating force received from the cam 46 in the direction away from the coupling gear 21.

When the release motor 53 is stopped, the wire 52 is released from a pulled state, and thus the biasing force of the elastic member rotates the cam 46 in the locking direction. This separates the releasing projection 48 of the cam 46 from the release-action portion 44 of the lock plate 41, thus bringing the lock plate 41 into contact with the coupling gear 21.

A seatback lock limit switch 55 (hereinafter, referred to as "a limit switch 55") is attached to the side frame 31. The limit switch 55 is off during the locked state, where the lock plate 41 is in engagement with the coupling gear 21. When the lock plate 41 is separated from the coupling gear 21 to be released from the locked state, the limit switch 55 is turned on.

The seat 11 comprises a controller 60 as shown in FIG. 4. The controller 60 controls driving of the reclining motor 37 and the release motor 53. The aforementioned limit switch 55 is coupled to the controller 60. The controller 60 is capable of determining an on/off state of the limit switch 55 on the basis of a signal inputted from the limit switch 55.

The automobile installed with the seat 11 is provided with switches to be operated by a user, namely a folding switch 3 and a return switch 5. Turning on the folding switch 3 releases the lock plate 41 and the coupling gear 21 from the locked state (coupled state).

Turning on the folding switch 3 thus allows the seatback 14 to be manually folded forward to the frontmost tilt position, thus bringing the seat 11 into the table state while the recliner 20 is at rest.

According to the seat 11 of the present embodiment, the seatback 14 is biased toward a direction of forward rotation (a direction of rotation toward the frontmost tilt position) by a not-shown elastic member. Thus, when the folding switch 3 is turned on to release the seatback 14 and the recliner 20 from the locked state, the seatback 14 is rotated, without manual operation, to or to the vicinity of the frontmost tilt position by a biasing force of the elastic member and its own weight.

Turning on the return switch 5 when the seatback 14 is in the frontmost tilt position allows the seatback 14 to be electrically returned by the reclining motor 37 to a specified position (for example, the standard position) in the seating area.

The automobile installed with the seat 11 is further provided with a seatback folding limit switch 56 (hereinafter, referred to as "a limit switch 56"). The limit switch 56 is on when the seatback 14 is in the frontmost tilt position.

The controller 60 controls the driving of the reclining motor 37 and the release motor 53 according to states of various switches including the folding switch 3, the return switch 5, the limit switch 55, and the limit switch 56.

(3) Operational Example of Seat Adjuster

Next, an operational example of the seat adjuster 2, more specifically, an operational example of rotation of the seatback 14 by the seat adjuster 2 will be described with reference to FIG. 6.

Figure 6:
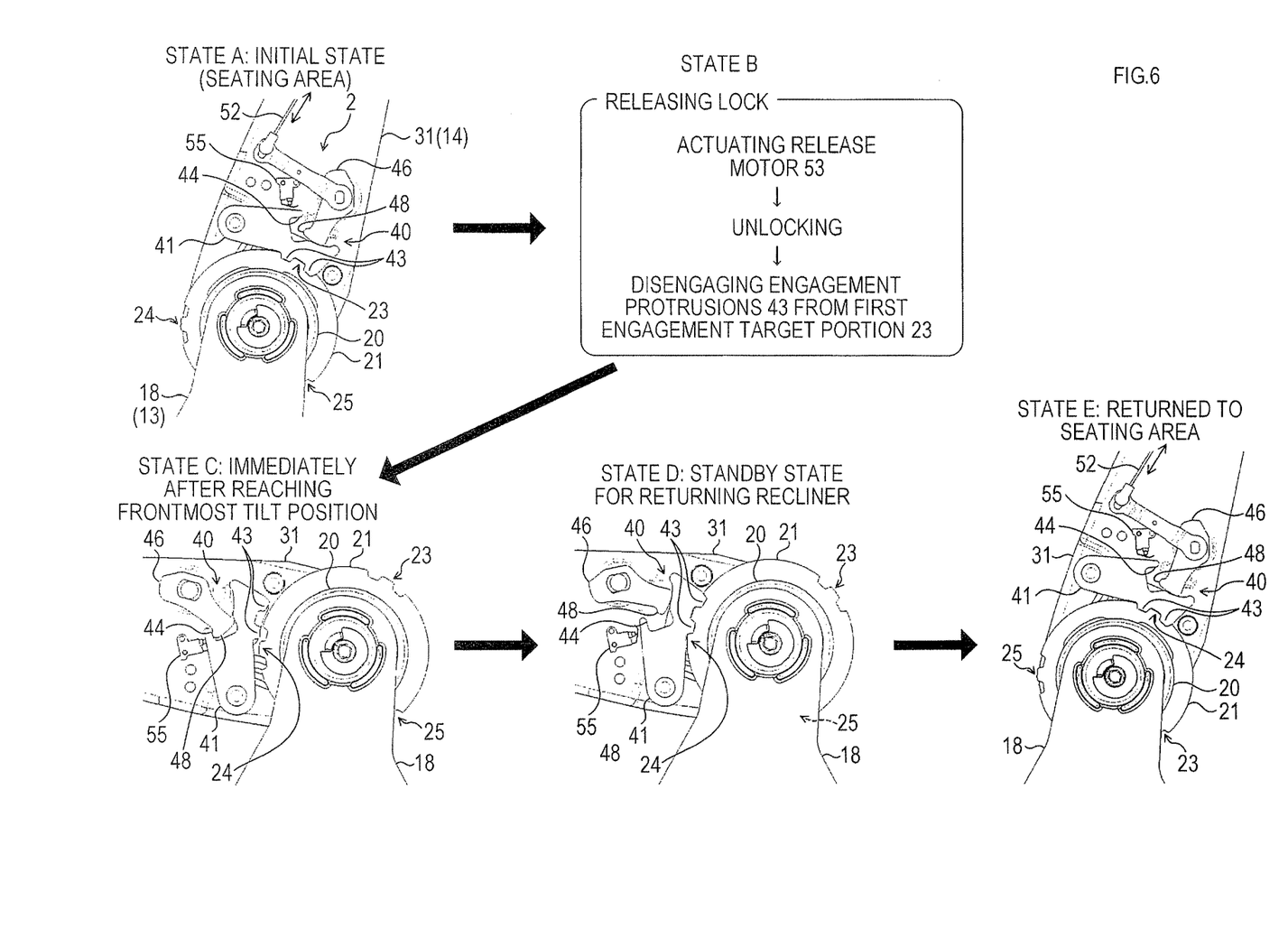
FIG. 6 is an explanatory diagram illustrating an operational example in one embodiment, in which the seatback is folded forward from a seating position and then returned to the seating position again.

As shown in State A of FIG. 6, a state where the seatback 14 is located in the seating area and the lock plate 41 is in engagement with the coupling gear 21 so that the seatback 14 is locked to the recliner 20 is called an initial state.

In the initial state, turning on the folding switch 3 releases the seatback 14 and the recliner 20 from the locked state. Specifically, the controller 60 actuates the release motor 53, rotating the cam 46 in the unlocking direction to disengage the engagement projections 43 of the lock plate 41 from the first engagement target portion 23 of the coupling gear 21 (State B of FIG. 6).

When the seatback 14 and the recliner 20 are released from the locked state, the seatback 14 is rotated forward to reach the frontmost tilt position as shown in State C of FIG. 6 by the aforementioned biasing force exerted on the seatback 14. A user may assist the seatback 14 in its rotation by manually applying a forward force to the seatback 14 as appropriate to allow the seatback 14 to reach the frontmost tilt position.

According to the seat 11 of the present embodiment, turning on the folding switch 3 separates the seatback 14 from the recliner 20, allowing the seatback 14 to be quickly folded forward to the frontmost tilt position without electrical power.

When the seatback 14 reaches the frontmost tilt position, the limit switch 56 is turned on, causing the controller 60 to stop the release motor 53. This allows the lock plate 41 to be biased against the coupling gear 21.

As described above, in the present embodiment, each of the angular intervals θ of the engagement target portions 23 to 25 of the coupling gear 21 is larger than the rotatable range of the seatback 14.

Thus, when the seatback 14 reaches the frontmost tilt position, the engagement projections 43 of the lock plate 41 do not reach a position to face the second engagement target portion 24 of the coupling gear 21. In other words, when the seatback 14 is in the frontmost tilt position after having been folded from the initial position following a release thereof 14 from the locked state, none of the three engagement target portions 23 to 25 of the coupling gear 21 is located in the engageable position with respect to the lock plate 41.

Thus, immediately after the seatback 14 reaches the frontmost tilt position, the lock plate 41 is biased against the coupling gear 21 following a stop of the release motor 53, but nonetheless, the lock plate 41, which is brought into contact with the coupling gear 21, is not brought into the locked state:

When the seatback 14 reaches the frontmost tilt position to thereby turn on the limit switch 56, the controller 60 actuates the reclining motor 37 to rotate the recliner 20 rearward (that is, rotate the recliner 20 clockwise in State C of FIG. 6).

"Rotation" of the recliner 20 means rotation of the internal gear 20b relative to the external gear 20a (and therefore, relative to the seat cushion 13) and further means integral rotation of the coupling gear 21 fixedly coupled to the internal gear 20b, with the internal gear 20b.

As shown in State D of FIG. 6, this causes the second engagement target portion 24, from among the three engagement target portions 23 to 25 of the coupling gear 21, to reach the engageable position, bringing the engagement projections 43 of the lock plate 41 into engagement with the second engagement target portion 24, thus producing the locked state.

The limit switch 55 is on when the seatback 14 and the recliner 20 are not in the locked state. When the seatback 14 is brought into the state of being locked to the coupling gear 21, as shown in State D of FIG. 6, the limit switch 55 is turned off. When the limit switch 55 is turned off, the controller 60 stops the reclining motor 37 to bring the seatback 14 into a standby state.

After the seatback 14 is folded to the frontmost tilt position, the recliner 20 may be rotated forward to lock the seatback 14 to the recliner 20. Rotating the recliner 20 forward (that is, rotating the coupling gear 21 forward) causes the first engagement target portion 23, which was in engagement with the lock plate 41 in the initial state, to reach the engageable position, bringing the lock plate 41 again into engagement with the first engagement target portion 23, thus producing the locked state.

However, as is obvious from positional relationships of the first engagement target portion 23 and the second engagement target portion 24 with respect to the lock plate 41 in State C of FIG. 6, the second engagement target portion 24 is located closer to the lock plate 41 than the first engagement target portion 23 is. When an amount of forward rotation required for the first engagement target portion 23 to reach the engageable position is compared to an amount of rearward rotation required for the second engagement target portion to reach the engageable position, it is obvious that the amount of rearward rotation required for the second engagement target portion to reach the engageable position is smaller. Thus, in the present embodiment, the recliner 20 is rotated rearward to bring the lock plate 41 into engagement with the coupling gear 21.

In the standby state shown in State D of FIG. 6, when a user turns on the return switch 5, the controller 60 actuates the reclining motor 37 to rotate the recliner 20 rearward. At this time, the lock plate 41 is in engagement with the coupling gear 21, and thus the seatback 14 is in the state of being locked to the coupling gear 21. As the recliner 20 is rotated rearward, the seatback 14 also is rotated rearward to return to a specified return position in the seating area as shown in State E of FIG. 6.

The controller 60 comprises a function to detect a position of the seatback 14 on the basis of a rotational position of the reclining motor 37. After the return switch 5 is turned on to start rotating the seatback 14 rearward, the controller 60 stops the reclining motor 37 when the controller 60 detects that the seatback 14 has reached the specified return position. The return position may be decided on as appropriate, may be, for example, the standard position, or may be a position in the initial state at which the seatback 14 is located just before the folding switch 3 is turned on.

(4) Effects of Embodiment

The following effects are obtained according to the embodiment described above.

According to the seat 11 of the present embodiment, the position of the seatback 14 can be adjusted electrically by the reclining motor 37 in the locked state, where the lock plate 41 is in engagement with any one of the three engagement target portions 23 to 25 of the coupling gear 21.

When the seatback 14 is in the seating area, turning on the folding switch 3 electrically releases the seatback 14 from the state of being locked to the recliner 20. Turning on the folding switch 3 to release the seatback 14 from the locked state allows the seatback 14 to be quickly folded forward to the frontmost tilt position without electrical power.

After the seatback 14 is folded forward following a release of the seatback 14 and the recliner 20 from the locked state, the recliner 20 is rotated rearward, bringing the lock plate 41 again into engagement with any one of the engagement target portions of the coupling gear 21, thus producing the locked state. Turning on the return switch 5 after that allows the seatback 14 to electrically return to the seating area.

The seat 11 according to the present embodiment can satisfy the need to quickly fold the seatback 14 forward without electrical power and then have the seatback 14 return electrically, thus offering increased convenience in adjusting the angle of the seatback.

The lock plate 41 is pivotally supported and coupled to be rotatable in a plane parallel to the plate surface of the coupling gear 21. The lock plate 41 is configured so that a rotation thereof produces a movement thereof in the direction closer to the coupling gear 21 or in the direction away from the coupling gear 21. Thus, the lock plate 41 can easily be engaged with or disengaged from the coupling gear 21 by rotating the lock plate 41.

The coupling gear 21 has an overall disk shape, comprising the engagement target portions formed at different locations in the outer peripheral edge of the coupling gear 21. More specifically, in the present embodiment, the three engagement target portions 23 to 25 are formed along the rotational direction at equal angular intervals. This allows the lock plate 41 to be engaged with the engagement target portion located closest thereto, from among the engagement target portions 23 to 25, after the seatback 14 is folded forward following a releases thereof from the locked state.

Each of the equal angular intervals between the engagement target portions of the coupling gear 21 is larger than the rotatable range of the seatback 14. In a process of forward folding of the seatback 14 after turning on the folding switch 3 to release the seatback 14 from the locked state, the lock plate 41 will never be engaged with the coupling gear 2 if it should be biased against the engagement target member. This prevents the forward folding of the seatback 14 from being unintentionally obstructed during the process of the forward folding.

According to the seat 11 of the present embodiment, the recliner 20 is coupled to the seat cushion 13, and the lock mechanism 40 comprising the lock plate 41 is coupled to the seatback 14. Further, a mechanism comprising the reclining motor 37 for rotating the recliner 20, the lock mechanism 40 and the release motor 53 to drive the lock mechanism 40 for locking and unlocking the seatback 14 to and from the recliner 20, and the like are all arranged in the seatback 14. This achieves compactness of the overall seat adjuster 2.

(5) Correspondence Relationships with Claims

Correspondence relationships between the description of the present embodiment and the language of the claims will now be supplementarily described. The recliner 20 corresponds to one example of a rotation mechanism, the internal gear 20b as an element of the recliner 20 corresponds to one example of a rotation part. The motor that rotates the recliner 20 corresponds to one example of a rotation drive device. The coupling gear 21 corresponds to one example of an engagement target member. The lock plate 41 corresponds to one example of an engagement member, and the release motor 53 as a power source to rotate the lock plate 41 corresponds to one example of an engagement drive device.

OTHER EMBODIMENTS

The embodiment of the present disclosure has been described above, but the present disclosure should not be limited to the above-described embodiment and can be practiced in various modified forms.

(1) It is not essential for the coupling gear 21 to have a disk shape. The coupling gear 21 may not have an overall disk shape, but should have a shape in which the engagement target portions are arranged along the same circumference.

(2) It is not essential to form the engagement target portions in the coupling gear 21 at equal angular intervals. The engagement target portions may be formed at two or more different angular intervals.

(3) It is not essential that each of the angular intervals of the engagement target portions of the coupling gear 21 be larger than the rotatable range of the seatback 14. The engagement target portions may be formed at angular intervals, each being smaller than the rotatable range of the seatback 14.

As described above, it may be decided as appropriate what a specific number of engagement target portions are formed in the coupling gear 21 at what specific angular intervals.

(4) The lock mechanism 40 of the aforementioned embodiment, as a mechanism to lock and unlock the seatback 14 to and from the recliner 20, is merely one example, and another configuration thereof may be adopted. For example, the number and/or the shape of the engagement projections 43 formed on the lock plate 41 may be different from those of the aforementioned embodiment. In such a case, the shape of each of the engagement target portions of the coupling gear 21 should match the shape of the engagement projections of the lock plate.

The locking and unlocking may be performed by an actuator other than the release motor 53.

It is not essential that the locking and unlocking be performed by rotation of the lock plate 41. For example, the locking and unlocking may be performed by a linear movement, with respect to the coupling gear, of the engagement member in a specified shape.

The seatback 14 and the recliner 20 may be released from the locked state by, for example, manually operating an operation lever.

(5) The recliner 20 of the aforementioned embodiment, as a rotation mechanism to rotate the setback 14, is merely one example, and a rotation mechanism comprising a configuration other than that of the recliner 20 of the aforementioned embodiment may automatically rotate the seatback 14.

(6) According to the aforementioned embodiment, the recliner 20 is coupled to the seat cushion 13, and the lock mechanism 40 is coupled to the seatback 14. It may be configured, on the contrary, that the recliner 20 is coupled to the seatback 14 and the lock mechanism 40 is coupled to the seat cushion 13.

(7) In addition, functions of one element of the aforementioned embodiment may be distributed to more than one element, and functions of more than one element may be integrated into one element. Part of the configuration of the aforementioned embodiment may be omitted. At least part of the configuration of the aforementioned embodiment may be added to or replaced with the configurations of the other embodiments described above. Any embodiment included in a technical idea defined only by the language of the claims is an embodiment of the present disclosure.

What is claimed is:

1. A seat adjuster for a vehicle seat,
wherein the vehicle seat comprises a seat cushion and a seatback pivotally supported to be rotatable relative to the seat cushion, and
wherein the seat adjuster comprises:
   a rotation mechanism comprising a rotation part, the rotation part being coupled to one of the seat cushion or the seatback and rotatable relative to a target to which the rotation part is coupled;
   a rotation drive device that rotates the rotation part of the rotation mechanism;
   an engagement target member that is coupled to the rotation part of the rotation mechanism and configured to be rotated integrally with the rotation part, the engagement target member comprising engagement target portions formed along a rotational direction of the engagement target member; and
   an engagement member that is coupled to the other of the seat cushion or the seatback and configured to be movable in a direction closer to the engagement target member and in a direction away from the engagement target member, the engagement member being configured so that, when one of the engagement target portions is located in a specified engageable position with respect to the engagement member, the engagement member is moved in the direction closer to the engagement target member to be engageable with the one of the engagement target portions located in the specified engageable position,
wherein the engagement target member comprises the engagement target portions formed along the rotational direction of the engagement target member at equal angular intervals.

2. The seat adjuster according to claim 1, comprising an engagement drive device that moves the engagement member in the direction closer to the engagement target member and in the direction away from the engagement target member.

3. The seat adjuster according to claim 1,
wherein the engagement target member has a disk shape and comprises the engagement target portions formed at different locations in an outer peripheral edge of the engagement target member, and
wherein, in the other of the seat cushion or the seatback, the engagement member is pivotally supported and coupled to be rotatable in a plane parallel with a plate surface of the engagement target member, the engagement member being configured so that a rotation thereof produces a movement thereof in the direction closer to the engagement target member or in the direction away from the engagement target member.

4. The seat adjuster according to claim 1,
wherein the seatback is configured to be rotatable with respect to the seat cushion within a rotatable range from a specified frontmost tilt position to a specified rearmost tilt position, and
wherein each of the equal angular intervals is larger than the rotatable range of the seatback.

5. The seat adjuster according to claim 1,
wherein the rotation mechanism is coupled to the seat cushion, and
wherein the engagement member is coupled to the seatback.

6. A vehicle seat comprising:
a seat cushion;
a seatback pivotally supported to be rotatable relative to the seat cushion;
a rotation mechanism comprising a rotation part, the rotation part being coupled to one of the seat cushion or the seatback and rotatable relative to a target to which the rotation part is coupled;
a rotation drive device that rotates the rotation part of the rotation mechanism;
an engagement target member that is coupled to the rotation part of the rotation mechanism and configured to be rotated integrally with the rotation part, the engagement target member comprising engagement target portions formed along a rotational direction of the engagement target member; and
an engagement member coupled to the other of the seat cushion or the seatback and configured to be movable in a direction closer to the engagement target member and in a direction away from the engagement target member, the engagement member being configured so that, when one of the engagement target portions is located in a specified engageable position with respect to the engagement member, the engagement member is moved in the direction closer to the engagement target member to be engageable with the one of the engagement target portions located in the specified engageable position,
wherein the engagement target member comprises the engagement target portions formed along the rotational direction of the engagement target member at equal angular intervals.

* * * * *